United States Patent [19]

Sandefur et al.

[11] Patent Number: 5,922,123
[45] Date of Patent: Jul. 13, 1999

[54] METHOD FOR CONDITIONING ORGANIC PIGMENTS

[75] Inventors: Charles W. Sandefur; Charles E. Shannon, both of Summerville; Brian L. Thompson, Goose Creek., all of S.C.

[73] Assignee: Bayer Corporation, Pittsburgh, Pa.

[21] Appl. No.: 08/992,280

[22] Filed: Dec. 17, 1997

[51] Int. Cl.$^6$ .......................... C04B 16/00; C08K 5/00
[52] U.S. Cl. .................. 106/493; 106/410; 106/412; 106/413; 106/494; 106/495; 106/497; 106/498; 106/499; 106/503; 106/504; 106/506; 106/31.75
[58] Field of Search .................. 106/410, 412, 106/413, 493, 494, 495, 497, 498, 499, 503, 504, 506, 31.75

[56] References Cited

U.S. PATENT DOCUMENTS

| | | | |
|---|---|---|---|
| 2,268,144 | 12/1941 | Vesce | 106/309 |
| 4,929,279 | 5/1990 | Hays | 106/412 |
| 5,662,739 | 9/1997 | Urban et al. | 106/497 |
| 5,728,206 | 3/1998 | Badejo | 106/493 |

FOREIGN PATENT DOCUMENTS

| | | |
|---|---|---|
| 758004 | 2/1997 | European Pat. Off. . |
| 63-003066 | 1/1988 | Japan . |
| 1119761 | 7/1968 | United Kingdom . |

OTHER PUBLICATIONS

K. Merkle & H. Schäfer "Surface Treatment of Organic Pigments" in Pigments Handbook, vol. III (NY: John Wiley & Sons Inc., 1973) month unavailable pp. 157–167.

R.B. McKay, "The Development of Organic Pigments with Particular Reference to Physical Form and Consequent Behaviour in Use" in Rev. Prog. Coloration, 10, 25–32 (month unavailable) 1979.

R.B. McKay, "Control of the application performance of classical organic pigments" in JOCCA, 89–93, (month unavailable) 1989.

W. Herbst and K. Hunger, Industrial Organic Pigments (NY: VCH Publishers, Inc., 1993), month unavailable, pp. 205–207.

Primary Examiner—Anthony Green
Attorney, Agent, or Firm—Joseph C. Gil; Richard E.L. Henderson

[57] ABSTRACT

This invention relates to a process for preparing pigment compositions by conditioning an organic pigment, at about 50 to about 200° C., with (1) at least about 0.1% by weight, relative to the organic pigment, of one or more surfactants of formula (I)

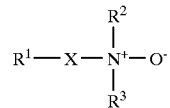

(I)

wherein
$R^1$ is a $C_8$–$C_{30}$ aliphatic group optionally having one or more carbon atoms in the main chain replaced with —O—, —S—, —CONH—, —NHCO—, —CH═CH—, $C_5$–$C_7$ cycloalkylene, phenylene, or —OSi($C_1$–$C_4$ alkyl)$_2$-,
$R^2$ is hydrogen, $C_1$–$C_6$ alkyl, or $C_1$–$C_6$ hydroxyalkyl,
$R^3$ is hydrogen, $C_1$–$C_6$ alkyl, or $C_1$–$C_6$ hydroxyalkyl, or $R^2$ and $R^3$ together are $C_4$–$C_7$ alkylene, and
X is a direct bond, or X and $R^2$ form a five- to seven-membered heterocyclic ring (and $R^3$ can form a double bond in X), or X, $R^2$, and $R^3$ together with the N-oxide nitrogen atom represent a bicyclic heterocycle, and (2) about 1 to about 100 parts by weight, per part by weight of the organic pigment, of a liquid in which the organic pigment is substantially insoluble.

17 Claims, No Drawings

METHOD FOR CONDITIONING ORGANIC PIGMENTS

BACKGROUND OF THE INVENTION

This invention relates to a process for preparing pigment compositions having improved dispersibility in plastics and other macromolecular materials by conditioning organic pigments with non-solvents containing certain surfactants containing N-oxide groups.

Organic pigments in the form initially obtained after chemical synthesis, often referred to as crude pigments, are generally unsuitable for use as pigments and must be subjected to one or more additional finishing steps that modify particle size, particle shape, and/or crystal structure in such a way that provides good pigmentary quality. See, for example, K. Merkle and H. Schäfer, "Surface Treatment of Organic Pigments" in *Pigment Handbook*, Vol. III (New York: John Wiley & Sons, Inc., 1973), page 157; R. B. McKay, "The Development of Organic Pigments with Particular Reference to Physical Form and Consequent Behavior in Use" in *Rev. Prog. Coloration*, 10, 25–32 (1979); and R. B. McKay, "Control of the application performance of classical organic pigments" in *JOCCA*, 89–93 (1989).

The most commonly used conditioning methods involve dissolving or suspending the crude pigment in strong mineral acids, followed by precipitation, and/or milling the crude pigment. Conditioning with a strong acid involves treating the crude pigment with aqueous mineral acid such as sulfuric acid in a process known as "acid pasting" (in which an acidic solution containing protonated pigment is formed) or "acid swelling" (in which a suspension of protonated pigment is formed). After the acid treatment is completed, the pigment is precipitated by adding the strongly acidic solution to a liquid in which the pigments are completely or almost completely insoluble, such as water or methanol or other lower aliphatic alcohols, as well as mixtures thereof.

Further treatment of conditioned organic pigments is sometimes desirable or necessary, particularly when the pigments are to be dispersed in plastics. Surface treatment is a type of finishing in which certain auxiliaries, such as rosin or other resins, are applied to pigments to influence their surface structure and thus their physical and coloristic properties. E.g., W. Herbst and K. Hunger, *Industrial Organic Pigments* (New York: VCH Publishers, Inc., 1993), pages 205–207. For example, treatment of organic pigments with emulsions of certain dispersing agents such as sulfonated dicarboxylic acids in non-aqueous volatile oils such as naphtha can improve the dispersibility of the pigments in non-aqueous vehicles used for inks, paints, and varnishes. E.g., U.S. Pat. No. 2,268,144. The elimination of such additional steps would be advantageous if desirable pigmentary properties could be maintained.

U.S. Pat. No. 5,662,739 describes a method for improving the dispersibility of quinacridone and dioxazine pigments by using certain fatty acid taurides. The fatty acid taurides, however, are amides rather than ammonium or amine compounds such as used in the present invention.

European Patent Application 758,004 describes a method for improving the dispersibility for a specific pigment, Pigment Yellow 12, by carrying out the preparative coupling reaction in the presence of certain cationic amine and amine oxide surfactants. The European application, however, does not mention other types of pigments and does not suggest that pigments could be conditioned in the presence of such surfactants.

An object of the present invention was reducing or eliminating the use of strong acids and eliminating further surface treatment steps while at the same time providing organic pigments that can be easily dispersed in plastics. These and other objects have been achieved by conditioning organic pigments with non-solvents containing specific types of surfactants containing N-oxide groups.

SUMMARY OF THE INVENTION

This invention relates to a process for preparing pigment compositions comprising (a) conditioning an organic pigment, at a temperature of about 50 to about 200° C., with
   (1) at least about 0.1% by weight (preferably 0.1 to 100% by weight, more preferably 2 to 15% by weight), relative to the organic pigment, of one or more surfactants having the formula (I)

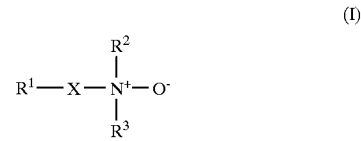

(I)

wherein
R$^1$ is a C$_8$–C$_{30}$ aliphatic group or a modified C$_8$–C$_{30}$ aliphatic group in which at least one carbon atom in the main chain is replaced with —O—, —S—, —CONH—, —NHCO—, —CH=CH—, optionally substituted C$_5$–C$_7$ cycloalkylene, optionally substituted phenylene, or —OSi(C$_1$–C$_4$ alkyl)$_2$—,
R$^2$ is hydrogen, C$_1$–C$_6$ alkyl, or C$_1$–C$_6$ hydroxyalkyl,
R$^3$ is hydrogen, C$_1$–C$_6$ alkyl, or C$_1$–C$_6$ hydroxyalkyl, or R$^2$ and R$^3$ together are C$_4$–C$_7$ alkylene (thereby forming a five- to eight-membered heterocycle), and
X is a direct bond, or X and R$^2$ together with the N-oxide nitrogen atom represents a five- to seven-membered heterocyclic ring and R$^3$ represents hydrogen, C$_1$–C$_6$ alkyl, C$_1$–C$_6$ hydroxyalkyl, or a double bond between the N-oxide nitrogen atom and the adjacent atom of X (preferably in a hetero-aromatic ring), or X, R$^2$, and R$^3$ together with the N-oxide nitrogen atom represent a bicyclic heterocycle having a bridgehead nitrogen atom, and
   (2) about 1 to about 100 parts by weight (preferably 4 to 15 parts by weight), per part by weight of the organic pigment, of a liquid in which the organic pigment is substantially insoluble,
thereby forming a suspension of the conditioned organic pigment in the liquid;

(b) optionally, surface treating the conditioned organic pigment; and (c) collecting the conditioned organic pigment.

This invention further relates to pigment compositions prepared by the process of this invention and to the use of such pigment compositions in the pigmentation of macromolecular substances, coatings, and inks.

DETAILED DESCRIPTION OF THE INVENTION

Suitable organic pigments that can be conditioned according to the process of the present invention include perylene, quinacridone, and isoindoline pigments, as well as other known organic pigments. Mixtures, including solid solutions, of such pigments are also suitable.

Perylenes, particularly the diimides and dianhydrides of perylene-3,4,9,10-tetracarboxylic acid, are particularly suitable organic pigments. Suitable perylene pigments can be unsubstituted or substituted, for example, with one or more alkyl, alkoxy, halogens such as chlorine, or other substituents typical of perylene pigments, including those substituted at imide nitrogen atoms with chemically reasonable groups such as alkyl. Crude perylenes can be prepared by methods known in the art. E.g., W. Herbst and K. Hunger, *Industrial Organic Pigments* (New York: VCH Publishers, Inc., 1993), pages 9 and 467–475; H. Zollinger, *Color Chemistry* (VCH Verlagsgessellschaft, 1991), pages 227–228 and 297–298; and M. A. Perkins, "Pyridines and Pyridones" in *The Chemistry of Synthetic Dyes and Pigments*, ed. H. A. Lubs (Malabar, Fla.: Robert E. Krieger Publishing Company, 1955), pages 481–482.

Quinacridone pigments are also suitable organic pigments. Quin-acridones (which, as used herein, includes unsubstituted quinacridone, quinacridone derivatives, and solid solutions thereof can be prepared by any of several methods known in the art but are preferably prepared by thermally ring-closing various 2,5-dianilinoterephthalic acid precursors in the presence of polyphosphoric acid. E.g., S. S. Labana and L. L. Labana, "Quinacridones" in *Chemical Review*, 67, 1–18 (1967), and U.S. Pat. Nos. 3,157,659, 3,256,285, 3,257,405, and 3,317,539. Suitable quinacridone pigments can be unsubstituted or substituted (for example, with one or more alkyl, alkoxy, halogens such as chlorine, or other substituents typical of quinacridone pigments).

Isoindoline pigments, which can optionally be symmetrically or unsymmetrically substituted, are also suitable organic pigments and can be prepared by methods known in the art. E.g., W. Herbst and K. Hunger, *Industrial Organic Pigments* (New York: VCH Publishers, Inc., 1993), pages 398–415. A particularly preferred isoindoline pigment, Pigment Yellow 139, is a symmetrical adduct of iminoisoindoline and barbituric acid precursors.

Other suitable organic pigments include phthalocyanines, dioxazines (that is, triphenedioxazines), 1,4-diketopyrrolopyrroles, anthrapyrimidines, anthanthrones, flavanthrones, indanthrones, perinones, pyranthrones, thioindigos, 4,4'-diamino-1,1'-dianthraquinonyl, and azo compounds, as well as substituted derivatives thereof.

The process of the present invention is suitable for conditioning crude organic pigments but it is also possible to use this process to improve the dispersibility of pigments already conditioned using other conditioning methods.

An organic pigment is first mixed in step (a) with surfactant (1) in the non-solvent liquid (2). Suitable surfactants are amine oxides of formula (I)

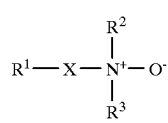

(I)

in which $R^1$, $R^2$, $R^3$, and X are defined as above.

The term "$C_8$–$C_{30}$ aliphatic" as used herein with respect to the descriptions of surfactants (1) refers to straight or branched chain aliphatic hydrocarbon groups having from 8 to 30 carbon atoms that can optionally be modified by replacing one or more carbon atoms in the main chain with —O—, —S—, —CONH—, —NHCO—, —CH=CH—, $C_5$–$C_7$ cyclo-alkylene, phenylene, or —OSi(alkyl)$_2$- in a chemically reasonable manner. When two or more such groups are present, they must, of course, also be present in chemically reasonable combinations. For example, heteroatoms are preferably not located adjacent to each other or to the N-oxide nitrogen atom. Furthermore, —O—, —S—, —CONH—, and —NHCO—groups cannot be attached directly to the N-oxide nitrogen atom. In addition to optional branching (which, in effect, corresponds to alkyl substitution of a linear chain), the $C_8$–$C_{30}$ aliphatic groups (including any —CH=CH—, $C_5$–$C_7$ cycloalkylene, and phenylene) can be substituted with groups such as $C_1$–$C_6$ alkoxy, $C_7$–$C_{16}$ aralkyl, halogen (especially fluorine in —CF$_2$- groups), hydroxy, oxo (i.e., as a keto oxygen), ($C_1$–$C_6$ alkoxy)carbonyl, ($C_6$–$C_{10}$ aryloxy)carbonyl, and cyano. Suitable $C_8$–$C_{30}$ aliphatic groups include alkyl groups such as octyl, decyl, undecyl, lauryl (i.e., dodecyl), myristyl (i.e., tetradecyl), cetyl (i.e., hexadecyl; also known as palmityl), stearyl (i.e., octadecyl), eicosanyl, and docosanyl (i.e., behenyl), as well as isomeric forms thereof; corresponding alkenyl, alkadienyl, and alka- trienyl groups such as 8-heptadecenyl or 9-octadecenyl (as the oleyl Z-isomer or the elaidyl E-isomer); amidoalkyl groups such as alkanamidoalkyl or alkenamidoalkyl (particularly stearamidopropyl, isostearamidopropyl, behenamidopropyl, or oleamidopropyl), cocamidoalkyl (i.e., coconut fatty acid amides of aminoalkyl groups, particularly cocamidopropyl) and ricinoleamidoalkyl (particularly ricinoleamidopropyl); and ethers such as alkoxylalkyl (particularly isodecyloxypropyl, $C_{12}$–$C_{15}$ alkoxypropyl, and isotridecyloxypropyl) and polyethers such as polyalkylenoxyalkyl (particularly polyethylenoxyethyl or polypropylenoxypropyl). Particularly preferred $C_8$–$C_{30}$ aliphatic groups include lauryl, isodecyloxypropyl, and $C_{12}$–$C_{15}$ alkoxylpropyl. It is also possible, although not preferred, to replace some or all of the main-chain carbon atoms of group $R^1$ with —OSi($C_1$–$C_4$ alkyl)$_2$- groups, which means that the term "$C_8$–$C_{30}$ aliphatic" as used herein also includes polysiloxane groups in which silicon and oxygen atoms are not attached directly to the N-oxide nitrogen atom but are instead attached through one or more intervening carbon atoms.

The term "$C_1$–$C_6$ alkyl" as used herein refers to straight or branched chain aliphatic hydrocarbon groups having from 1 to 6 carbon atoms, also referred to as lower alkyl. Examples of $C_1$–$C_6$ alkyl are methyl, ethyl, propyl, butyl, pentyl, hexyl, and the isomeric forms thereof. The term "$C_1$–$C_6$ alkoxy" refers to straight or branched chain alkyl oxy groups having from 1 to 6 carbon atoms. Examples of $C_1$–$C_6$ alkoxy are methoxy, ethoxy, propoxy, butoxy, pentyloxy, hexyloxy, and the isomeric forms thereof. The term "$C_7$–$C_{16}$ aralkyl" refers to $C_1$–$C_6$ alkyl substituted with $C_6$–$C_{10}$ aryl such that the total number of carbon atoms is from 7 to 16. Examples of $C_7$–$C_{16}$ aralkyl are benzyl, phenethyl, and naphthylmethyl. The term "($C_1$–$C_6$ alkoxy)carbonyl" refers to straight or branched chain alkoxycarbonyl groups having from 1 to 6 carbon atoms in the alkoxy portion. Examples of ($C_1$–$C_6$ alkoxy)carbonyl are methoxycarbonyl, ethoxycarbonyl, propoxycarbonyl, butoxycarbonyl, pentyloxycarbonyl, hexyloxycarbonyl, and the isomeric forms thereof. The term "($C_6$–$C_{10}$ aryloxy) carbonyl" refers to phenoxycarbonyl and 1- or 2-naphthoxycarbonyl, in which the aryl portion can optionally be further substituted with halogen, alkyl, alkoxy, alkoxycarbonyl, or nitro. Examples of halogen are fluorine, chlorine, bromine, and iodine.

Non-cyclic surfactants of formula (I), in which $R^2$, $R^3$, and X do not form heterocyclic rings, are generally more preferred than surfactants of formula (I) in which two or more of the $R^2$, $R^3$, and X groups form a heterocyclic ring incorporating the N-oxide nitrogen atom.

Preferred non-cyclic surfactants are compounds of formula (II)

$$R^1-\overset{\overset{R^2}{|}}{\underset{\underset{R^3}{|}}{N^+}}-O^-  \quad\quad (II)$$

in which $R^1$ is a $C_8-C_{30}$ aliphatic group that can optionally be modified by replacing one or more main-chain carbon atom with —O—, —CONH—, —NHCO—, or —CH=CH—, and $R^2$ and $R^3$ are independently $C_1-C_6$ alkyl (preferably methyl) or $C_1-C_6$ hydroxyalkyl (preferably 2-hydroxyethyl). Particularly preferred surfactants of formula (II) are N-lauryl-N,N-dimethyl-amine oxide, an amine oxide in which $R^1$ is lauryl and $R^2$ and $R^3$ are methyl; N,N-bis(2-hydroxyethyl)-N-(isodecyloxypropyl)amine oxide, an amine oxide in which $R^1$ is isodecyloxypropyl and $R^2$ and $R^3$ are 2-hydroxyethyl; and N,N-bis(2-hydroxyethyl)-N-($C_{12}-C_{15}$ alkoxypropyl)-amine oxide, an amine oxide in which $R^1$ is $C_{12}-C_{15}$ alkoxypropyl and $R^2$ and $R^3$ are 2-hydroxyethyl.

Cyclic surfactants of formula (I) can contain heterocyclic rings formed by various combinations of $R^2$, $R^3$, and X. In one type of cyclic surfactant, groups $R^2$ and $R^3$ together are $C_4-C_7$ alkylene and thus form a five- to eight-membered heterocycle in compounds of formula (III)

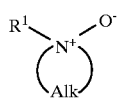

(III)

in which $R^1$ is a $C_8-C_{30}$ aliphatic group and Alk represents the $C_4-C_7$ alkylene group. The term "$C_4-C_7$ alkylene" as used in the description of such compounds refers to straight or branched chain difunctional aliphatic hydrocarbon groups having from 4 to 7 carbon atoms that, as used herein, form five- to eight-membered heterocyclic rings incorporating the N-oxide nitrogen atom. Examples of $C_4-C_7$ alkylene are butylene, pentylene, hexylene, and heptylene. Although generally not preferred, it is also possible to replace one or more carbon atoms of the alkylene with heteroatoms such as N (e.g., as NH or N-alkyl), O, or S as long as such heteroatoms are not located adjacent to each other or to the N-oxide nitrogen atom. Preferred compounds of formula (III) contain heterocyclic ring systems such as piperidine, piperazine, pyrrolidine, imidazoline, morpholine, and the like.

In a second type of cyclic surfactant of formula (I), groups X and $R^2$ together with the N-oxide nitrogen atom represent a five- to seven-membered heterocyclic ring, which can be non-aromatic or aromatic. Cyclic surfactants containing non-aromatic rings of this type can be represented by formula (IV)

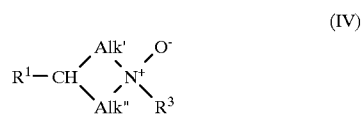

(IV)

in which Alk' and Alk" together are combinations of $C_1-C_5$ alkylene groups and/or a direct bond that, together with the N-oxide nitrogen atom and the CH, form five- to seven-membered heterocyclic rings. The term "$C_1-C_5$ alkylene" as used in the description of such compounds refers to difunctional aliphatic hydrocarbon groups having from 1 to 5 carbon atoms that, as used herein, form five- to seven-membered heterocyclic rings incorporating the N-oxide nitrogen atom. Examples of $C_1-C_5$ alkylene are methylene, ethylene, propylene, butylene, and pentylene. Although generally not preferred, it is also possible to replace one or more carbon atoms of such heterocyclic rings with additional heteroatoms such as N (e.g., as NH or N-alkyl), O, or S as long as such heteroatoms are not located adjacent to each other or to the N-oxide nitrogen atom. The non-aromatic rings can also contain one or two ring double bonds, including double bonds incorporating the N-oxide nitrogen atom (i.e., compounds within the meaning of formula (IV) in which $R^3$ represents a double bond with the first atom of X). Preferred compounds of formula (IV) contain heterocyclic ring systems such as piperidine, piperazine, pyrrolidine, imidazoline, morpholine, and the like.

Cyclic surfactants containing aromatic rings can be represented by formula (V)

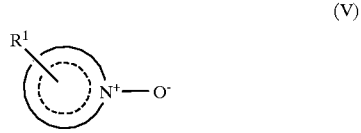

(V)

in which the ring represents a five- or six-membered aromatic ring system (including, for example, pyridine, pyrimidine, pyrazine, thiophene, and the like) and $R^1$ is defined as above. Preferred aromatic surfactants are pyridine derivatives having the formula (Va)

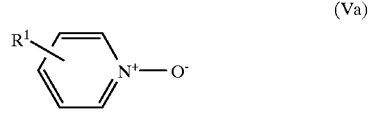

(Va)

in which $R^1$ is defined as above but is preferably a $C_8-C_{30}$ aliphatic group having a —NHCO— attached through the carbonyl carbon at the position meta to the N-oxide nitrogen atom (i.e., a nicotinamide N-oxide derivative).

In a third type of cyclic surfactant of formula (I), groups $R^2$, $R^3$, and X together with the N-oxide nitrogen atom represent a bicyclic heterocycle having a bridgehead nitrogen atom. Cyclic surfactants containing bicyclic rings of this type can be represented by formula (VI)

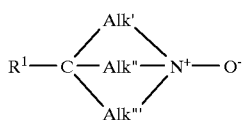

(VI)

in which Alk', Alk", and Alk'" are independently $C_2$–$C_4$ alkylene groups that, together with the N-oxide nitrogen atom, represent bicyclic hetero-cycles having a bridgehead nitrogen atom. Preferred compounds of formula (VI) contain bicyclic heterocyclic rings such as 1,4-diazabicyclo-[2.2.2] octane 1-oxide. Bicyclic surfactants also include compounds in which $R^1$ is not attached to a bridgehead atom.

Mixtures of the surfactants described above are, of course, also suitable.

It is possible to include as additional components in step (a) surfactants other than those of formula (I), as well as other conventional additives. Examples of suitable such additives include long-chain fatty acids, such as stearic acid or behenic acid, or corresponding amides, esters, or salts, such as magnesium stearate, zinc stearate, aluminum stearate, or magnesium behenate; resin acids, such as abietic acid, rosin soap, hydrogenated or dimerized rosin; $C_{12}$–$C_{18}$-paraffin-disulfonic acids; sulfonated dicarboxylic acids or corresponding esters or amides thereof, such as sulfosuccinates, sulfosuccinamates, and derivatives thereof; alkyl phosphates and phosphonates; amines, such as laurylamine or stearylamine; polyamines, such as polyethylenimines; quaternary ammonium compounds, such as tri [($C_1$–$C_4$ alkyl)benzyl]ammonium salts; alkyl-phenols; alcohols and diols, such as stearyl alcohol and dodecane-1, 2-diol; alkoxylated fatty acids and amides, alkoxylated alcohols, alkoxylated alkylphenols, and glycol esters; waxes, such as polyethylene wax; and plasticizers, such as epoxidized soya bean oil. Such additives can be incorporated in amounts ranging from about 0.1 to 20% by weight (preferably 0.1 to 5% by weight), based on the amount of the surfactants according to the invention. Conventional additives can themselves sometimes improve pigment dispersibility. However, even when such additives are included, pigments conditioned with the surfactants of formula (I) according to the invention exhibit improved dispersibilities relative to pigments that are not treated with surfactants according to the invention.

Conditioning step (a) is carried in a liquid (2) in which the organic pigment is substantially insoluble, preferably water, a water-soluble (including partly water-soluble) organic liquid, or mixtures thereof. Suitable liquids include water and mixtures of water and lower aliphatic alcohols, such as methanol; ketones and ketoalcohols, such as acetone, methyl ethyl ketone, and diacetone alcohol; amides, such as dimethyl-formamide and dimethylacetamide; ethers, such as tetrahydrofuran and dioxane; alkylene glycols and triols, such as ethylene glycol and glycerol; and other such organic liquids known in the art. Other organic liquids can be used but are generally less preferred. In general, at least 0.1% by weight (preferably 0.1 to 100% by weight (that is, a one-to-one weight ratio) and more preferably 2 to 15% by weight) of the surfactant, relative to the organic pigment, is used.

The temperature for step (a) should be maintained between about 50° C. and about 200° C., preferably between 70° C. and 150° C.

The conditioned organic pigment can optionally be surface treated in step (b), either in situ or after being isolated, by mixing the conditioned organic pigment with a suitable surface treatment additive in a liquid (such as those described above) in which the organic pigment is substantially insoluble. Suitable additives include the additives described above for use in conjunction with the surfactants of the invention.

The conditioned and optionally surface-treated organic pigment is collected in step (c) by methods known in the art but is preferably collected by filtration followed by washing to remove residual salts and solvent. Other collection methods known in the art, such as centrifugation or even simple decantation, are suitable but generally less preferred. The pigment is then dried for use or for further manipulation before use.

The pigments of this invention give a very good tinctorial yield and are readily dispersible (for example, in plastic materials). Because of their light stability and migration properties, the pigments according to the present invention are suitable for many different pigment applications.

The pigments of the present invention are particularly suitable for use with macromolecular materials, especially synthetically produced macromolecular substances. Examples of synthetic macromolecular substances include plastic materials, such as polyvinyl chloride, polyvinyl acetate, and polyvinyl propionate; polyolefins, such as polyethylene and polypropylene; high molecular weight polyamides; polymers and copolymers of acrylates, methacrylates, acrylonitrile, acrylamide, butadiene, or styrene; polyurethanes; and polycarbonates. Other suitable macromolecular substances include those of a natural origin, such as rubber; those obtained by chemical modification, such as acetyl cellulose, cellulose butyrate, or viscose; or those produced synthetically, such as polymers, polyaddition products, and polycondensates. The materials pigmented with the pigments of the invention can have any desired shape or form, including molded articles, films, and fibers.

The pigments of the present invention are also suitable for pigmented mixtures with other materials, pigment formulations, coating compositions and paints, printing ink, and colored paper. The term "mixtures with other materials" is understood to include, for example, mixtures with inorganic white pigments, such as titanium dioxide (rutile) or cement, or other inorganic pigments. Examples of pigment formulations include flushed pastes with organic liquids or pastes and dispersions with water, dispersants, and, if appropriate, preservatives. Examples of coating compositions and paints in which pigments of this invention can be used include, for example, physically or oxidatively drying lacquers, stoving enamels, reactive paints, two-component paints, solvent- or water-based paints, emulsion paints for weatherproof coatings, and distempers. Printing inks include those known for use in paper, textile, and tinplate printing.

The following examples further illustrate details for the process of this invention. The invention, which is set forth in the foregoing disclosure, is not to be limited either in spirit or scope by these examples. Those skilled in the art will readily understand that known variations of the conditions of the following procedures can be used. Unless otherwise noted, all temperatures are degrees Celsius and all percentages and parts are percentages by weight and parts by weight, respectively.

EXAMPLES

Pigment dispersibilities in polyvinyl chloride ("PVC") were evaluated by comparing hot-milled and cold-milled color development according to the following procedure.

For each sample tested, a mixture of 48.95 g of flexible PVC and 1.0 g of a 50% titanium dioxide paste was added to a hot (155° C.) two-roll mill having a nip thickness of 25 mils (ca. 0.6 mm) and fluxed until uniform. A 0.050 g portion of the test pigment or comparison pigment was sprinkled into the nip over a period of about ten seconds, after which the fluxed material was cut and rolled on the mill for five minutes. The pigmented sheet was then removed from the mill and placed on a clean flat surface to cool. A piece cut from the resultant sheet and allowed to cool to room temperature was used as the "hot-milled" sample for evaluation. A sample cut from the same sheet while still warm was placed on a cold (24° C.) two-roll mill having a nip thickness of 21 mils (ca. 0.5 mm), then folded and passed through the mill seven times. The cold-rolled sheet was again fluxed in the hot mill until smooth. A sample cut from the resultant sheet was used as the "cold-milled" sample for evaluation. The reflectances of corresponding hot-milled and cold-milled samples were determined using a Datacolor CS-5 spectro-photometer and converted to K/S values according to the Kubelka-Munk equation. Dispersibilities were calculated by comparing the K/S value of each hot-milled sample with the K/S value of the corresponding cold-milled samples (which are assumed to have reached 100% dispersion and maximum K/S values). In general, dispersibilities were considered excellent for values of 80 to 100%, good for values of 60 to less than 80%, fair if 40 to less than 60%, poor if 20 to less than 40%, and very poor if less than 20%.

Examples 1–3

Treatment of dimethylperylene pigment

Examples 1 and 2 describe the conditioning of crude dimethyl-perylenediimide presscake (Pigment Red 179) according to the invention. Comparison Example 3 was carried out by the same general method as used for Example 1 but without an amine oxide surfactant.

Example 1

Crude N,N-dimethylperylenediimide presscake (114.9 g, corresponding to 29.3 g of 100% strength pigment) was slurried in a mixture of 124.9 g of methanol, 197.6 g of water, 2.9 g of 50% sodium hydroxide, and 9.7 g of 30% active N-lauryl-N,N-dimethylamine oxide. The resultant slurry was heated at 135° C. for four hours in a laboratory Parr reactor, then cooled to 45° C. and diluted to 700 ml with water. An aqueous emulsion containing 0.08 g of sodium dioctyl sulfosuccinate and 0.8 g of aliphatic naphtha was added and the slurry was held at 45° C. for three hours. The solid component was collected by filtration, washed, dried, and pulverized to a powder having excellent dispersibility in PVC. Test results are shown in Table 1.

Example 2

A pigment was prepared in the same manner as Example 1 except that 5.6 g of 51.9% active N,N-bis(2-hydroxyethyl)-N-($C_{12}$–$C_{15}$ alkoxypropyl)amine oxide was used instead of N-lauryl-N,N-dimethylamine oxide. The resultant pigment exhibited excellent dispersibility in PVC. Test results are shown in Table 1.

Example 3 (Comparison)

Crude N,N-dimethylperylenediimide (86.1 g, corresponding to 26.0 g of 100% strength pigment) was slurried in a mixture of 296.1 g of methanol, 15.2 g of water, and 2.6 g of 50% sodium hydroxide. The resultant slurry was heated at 120° C. for four hours, then cooled and diluted to 700 ml with water. An aqueous emulsion containing 0.8 g of sodium dioctyl sulfosuccinate and 13.0 g of aliphatic naphtha was added and the slurry heated at 45° C. for three hours. The solid component was collected by filtration, washed, dried, and pulverized to a powder having poor dispersibility in PVC. Test results are shown in Table 1.

TABLE 1

Dispersibilities in PVC for Examples 1–3

| Example | Dispersibility in PVC Calculated (%) | Rating |
|---|---|---|
| 1* | 84.4% | Excellent |
| 2* | 84.1% | Excellent |
| 3* (comp) | 34.5% | Poor |

*Sodium dioctyl sulfosuccinate and aliphatic naphtha included during conditioning Examples 1–3 show that conditioning perylene pigments in the presence of amine oxide surfactants according to the invention (i.e., Examples 1 and 2) provides more highly dispersible pigments than untreated pigments (i.e., comparison Example 3).

Examples 4–5

Treatment of dimethylquinacridone pigment

Example 4 describes the conditioning of crude dimethylquin-acridone presscake (Pigment Red 122) according to the invention. Comparison Example 5 was carried out by the same general method as used for Example 4 but without an amine oxide surfactant.

Example 4

Crude 2,9-dimethylquinacridone filter cake (121.1 g, corresponding to 29.3 g dry weight) was slurried in a mixture of 208.2 g of methanol, 112.1 g of water, 2.9 g of 50% sodium hydroxide, and 5.7 g of 51.2% active N, N-bis(2-hydroxyethyl)-N-(isodecyloxypropyl)amine oxide. The resultant slurry was heated at 125° C. for four hours in a laboratory Parr reactor, then cooled to 45° C. An aqueous emulsion containing 1.0 g of sodium dioctyl sulfosuccinate and 14.7 g of aliphatic naphtha was added and the slurry was held at 45° C. for three hours. The solid component was collected by filtration, washed, dried, and pulverized to a powder having good dispersibility in PVC. Test results are shown in Table 2.

Example 5 (comparison)

Crude 2,9-dimethylquinacridone filter cake (163.7 g, corresponding to 29.3 g dry weight) was slurried in a mixture of 209.6 g of methanol, 73.8 g of water, and 2.9 g of 50% sodium hydroxide. The resultant slurry was heated at 125° C. for four hours, then cooled. An aqueous emulsion containing 1.0 g of sodium dioctyl sulfosuccinate and 14.7 g of aliphatic naphtha was added and the slurry was held at 45° C. for three hours. The solid component was collected by filtration, washed, dried, and pulverized to a powder having poor dispersibility in PVC. Test results are shown in Table 2.

TABLE 2

Dispersibilities in PVC for Examples 4–5

| Example | Dispersibility in PVC Calculated (%) | Rating |
|---|---|---|
| 4* | 72.8% | Good |
| 5* (comp) | 37.6% | Poor |

*Sodium dioctyl sulfosuccinate and aliphatic naphtha included during conditioning Examples 4 and 5 show that conditioning quinacridone pigments in the presence of an amine oxide surfactant according to the invention provides more highly dispersible pigment than untreated pigments.

Examples 6–8

Treatment of an isoindoline pigment

Examples 6 and 7 describes the conditioning of crude Pigment Yellow 139 (an isoindoline pigment) according to the invention. Example 7 also included sodium dioctyl sulfosuccinate and aliphatic naphtha during conditioning. Comparison Example 8 was carried out by the same general method as used for Example 6 except for omitting the amine oxide surfactant.

Example 6

Crude Pigment Yellow 139 presscake (71.6 g, corresponding to 15 g of 100% strength pigment) was slurried in 300 g of water. When the mixture became uniform, 2.5 g of N-lauryl-N,N-dimethylamine oxide was added and the pH was adjusted to 4.5. The mixture was heated at 110° C. for three hours in a laboratory Parr reactor, then cooled to room temperature. An aqueous emulsion containing 0.4 g of sodium dioctyl sulfosuccinate and 14.7 g of aliphatic naphtha was added and the slurry was held at 45° C. for three hours. The solid component was collected by filtration and washed with water. The wet presscake was dried in an oven at 60° C. overnight to yield 15.0 g of a greenish-yellow pigment exhibiting soft texture with good dispersibility in PVC. Test results are shown in Table 3.

Example 7 (Comparison)

A comparison pigment was prepared in the same manner as Example 6 except that the N-lauryl-N,N-dimethylamine oxide was omitted. The resultant pigment exhibited very poor dispersibility in PVC. Test results are shown in Table 3.

Example 8 (comparison)

A comparison pigment was prepared in the same manner as Example 6 except that the N-lauryl-N,N-dimethylamine oxide and the mixture of sodium dioctyl sulfosuccinate and aliphatic naphtha were omitted. The resultant pigment exhibited very poor dispersibility in PVC. Test results are shown in Table 3.

TABLE 3

Dispersibilities in PVC for Examples 6–8

| Example | Dispersibility in PVC Calculated (%) | Rating |
|---|---|---|
| 6* | 76.9% | Good |
| 7* (comp) | 4.8% | Very poor |
| 8 (comp) | 2.9% | Very poor |

*Sodium dioctyl sulfosuccinate and aliphatic naphtha included during conditioning Examples 6–8 show that conditioning isoindoline pigments in the presence of an amine oxide according to the invention provides more highly dispersible pigments than untreated pigments.

What is claimed is:

1. A process for preparing pigment compositions comprising
   (a) conditioning an organic pigment, at a temperature of about 50 to about 200° C., with a mixture consisting essentially of
      (1) at least about 0.1% by weight, relative to the organic pigment, of one or more surfactants having the formula

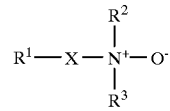

wherein
   $R^1$ is a straight or branched chain $C_8$–$C_{30}$ aliphatic group or a modified straight or branched chain $C_8$–$C_{30}$ aliphatic group in which at least one carbon atom in the main chain of the aliphatic group is replaced with —O—, —S—, —CONH—, —NHCO—, —CH=CH—, optionally substituted $C_5$–$C_7$ cycloalkylene, optionally substituted phenylene, or —OSi($C_1$–$C_4$ alkyl)$_2$—,
   $R^2$ is hydrogen, $C_1$–$C_6$ alkyl, or $C_1$–$C_6$ hydroxyalkyl,
   $R^3$ is hydrogen, $C_1$–$C_6$ alkyl, or $C_1$–$C_6$ hydroxyalkyl, or $R^2$ and $R^3$ together are $C_4$–$C_7$ alkylene, and
   X is a direct bond, or X and $R^2$ together with the N-oxide nitrogen atom represents a five- to seven-membered heterocyclic ring and $R^3$ represents hydrogen, $C_1$–$C_6$ alkyl, $C_1$–$C_6$ hydroxyalkyl, or a double bond between the $N^+$—$O^-$ nitrogen atom and the adjacent atom of X, or X, $R^2$, and $R^3$ together with the $N^+O^-$ oxide nitrogen atom represent a bicyclic heterocycle having a bridgehead nitrogen atom,
   (2) about 1 to about 100 parts by weight, per part by weight of the organic pigment, of a liquid in which the organic pigment is substantially insoluble, and
   (3) optionally, about 0.1 to 20% by weight, based on the amount of surfactant (1), of one or more additives selected from the group consisting of long-chain fatty acids and corresponding amides, esters, and salts; resin acids; $C_{12}$–$C_{18}$-paraffin-disulfonic acids; sulfonated dicarboxylic acids and corresponding esters and amides; alkyl phosphates and phosphonates; laurylamine, stearylamine; polyamines; quaternary ammonium compounds; alkyl phenols; alcohols and diols; alkoxylated fatty acids and amides; alkoxylated alcohols; alkoxylated alkylphenols; glycol esters; waxes; and plasticizers, thereby forming a suspension of the conditioned organic pigment in the liquid;

(b) optionally, surface treating the conditioned organic pigment; and (c) collecting the conditioned organic pigment.

2. A process according to claim 1 wherein the organic pigment is a perylene, quinacridone, phthalocyanine, or isoindoline.

3. A process according to claim 1 wherein surfactant (1) is a non-cyclic ionic surfactant having the formula

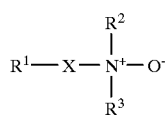

wherein $R^1$ is a straight or branched chain $C_8$–$C_{30}$ aliphatic group or a modified straight or branched chain $C_8$–$C_{30}$ aliphatic group in which at least one carbon atom in the main chain of the aliphatic group is replaced with —O—, —CONH—, —NHCO—, or —CH=CH—; and $R^2$ and $R^3$ are independently $C_1$–$C_6$ alkyl or $C_1$–$C_6$ hydroxyalkyl.

4. A process according to claim 1 wherein surfactant (1) is N-lauryl-N,N-dimethylamine oxide, N,N-bis(2-hydroxyethyl)-N-(isodecyloxypropyl)amine oxide, or N,N-bis(2-hydroxyethyl)-N-($C_{12}$–$C_{15}$ alkoxypropyl)amine oxide.

5. A process according to claim 1 wherein surfactant (1) is a cyclic surfactant having the formula

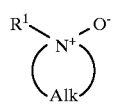

wherein $R^1$ is a $C_8$–$C_{30}$ aliphatic group and Alk represents a $C_4$–$C_7$ alkylene group.

6. A process according to claim 1 wherein surfactant (1) is a cyclic surfactant having the formula

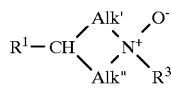

wherein Alk' and Alk" together are combinations of $C_1$–$C_5$ alkylene groups and/or a direct bond that, together with the $N^+$—$O^-$ nitrogen atom, and the CH, form a five- to seven-membered heterocyclic ring.

7. A process according to claim 1 wherein surfactant (1) is a cyclic surfactant having the formula

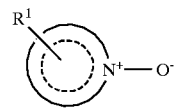

wherein the ring represent a five- or six-membered aromatic ring and $R^1$ is a $C_8$–$C_{30}$ aliphatic group.

8. A process according to claim 1 wherein surfactant (1) is a cyclic surfactant having the formula

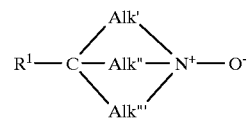

wherein $R^1$ is a straight or branched chain $C_8$–$C_{30}$ aliphatic group or a modified straight or branched chain $C_8$–$C_{30}$ aliphatic group in which at least one carbon atom in the main chain of the aliphatic group is replaced with —O—, —S—, —CONH—, —NHCO—, —CH=CH—, optionally substituted $C_5$–$C_7$ cycloalkylene, optionally substituted phenylene, or —OSi($C_1$–$C_4$ alkyl)$_2$-; and Alk', Alk", and Alk'" are independently $C_2$–$C_4$ alkylene groups that, together with the $N^+$—$O^-$ nitrogen atom, represent a bicyclic heterocycle having a bridgehead nitrogen atom.

9. A process according to claim 1 wherein 0.1 to 100% by weight, relative to the organic pigment, of surfactant (1) is used.

10. A process according to claim 1 wherein 6 to 12 parts by weight per part by weight of the organic pigment of liquid (2) is used in step (a).

11. A process according to claim 8 wherein liquid (2) is water, a water-soluble organic liquid, or a mixture thereof.

12. A process according to claim 1 wherein the conditioned pigment is treated with a surface treatment additive.

13. A process according to claim 1 wherein the conditioned pigment is collected by filtration.

14. A pigment composition prepared according to the process of claim 1.

15. A pigmented macromolecular substance containing as pigment a pigment composition prepared according to the process of claim 1.

16. A pigmented coating composition containing as pigment a pigment composition prepared according to claim 1.

17. A pigmented printing ink containing as pigment a pigment composition prepared according to claim 1.

* * * * *